(12) United States Patent
Kawasumi

(10) Patent No.: US 7,859,979 B2
(45) Date of Patent: Dec. 28, 2010

(54) OPTICAL DISK APPARATUS, LASER POWER CONTROLLER, AND LASER POWER CONTROL METHOD

(75) Inventor: Takafumi Kawasumi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 967 days.

(21) Appl. No.: 11/682,168

(22) Filed: Mar. 5, 2007

(65) Prior Publication Data
US 2007/0230313 A1 Oct. 4, 2007

(30) Foreign Application Priority Data
Mar. 28, 2006 (JP) .............................. 2006-087183

(51) Int. Cl.
*G11B 7/00* (2006.01)
(52) U.S. Cl. ................. 369/116; 369/53.37; 369/53.29; 369/59.11; 369/59.1
(58) Field of Classification Search ................. 369/116, 369/53.26, 53.37, 59.1, 59.11
See application file for complete search history.

(56) References Cited

U.S. PATENT DOCUMENTS

| | | | |
|---|---|---|---|
| 6,373,805 B1 * | 4/2002 | Song ........................ | 369/100 |
| 7,411,890 B2 * | 8/2008 | Shin et al. ................ | 369/275.4 |

FOREIGN PATENT DOCUMENTS

| JP | 4-62518 U | | 5/1992 |
|---|---|---|---|
| JP | 8-180447 A | | 7/1996 |
| JP | 08180447 A | * | 7/1996 |
| JP | 2003-99935 A | | 4/2003 |
| JP | 2003099935 A | * | 4/2003 |

\* cited by examiner

*Primary Examiner*—Wayne R Young
*Assistant Examiner*—Latanya Bibbins
(74) *Attorney, Agent, or Firm*—Sughrue Mion, PLLC

(57) ABSTRACT

A laser power controller includes a loop control section to control a laser light output level of an optical head that applies laser light onto a disk for recording data to be a prescribed value, a DAC control section to hold as a previous level a laser control level preceding switching of a laser output level upon track change between a groove track and a land track during recording, and an analog SW to select the DAC control section to control the laser light output level by the previous level for a certain time period from the track change and to select the loop control section after the certain time period.

13 Claims, 8 Drawing Sheets

RELATED ART

OPTICAL DISK APPARATUS, LASER POWER CONTROLLER, AND LASER POWER CONTROL METHOD

BACKGROUND OF THE INVENTION

1. Field of the Invention

The present invention relates to a laser power controller and a laser power control method suitable for recording data onto an optical disk by land/groove track recording such as a DVD-RAM (Digital Versatile Disk Random Access Memory), and an optical disk recording apparatus including the laser power controller.

2. Description of Related Art

A recording apparatus of an optical disk records data by way of applying laser light and controlling a laser power. Optimization of a laser power is an important factor that affects the recording quality. A laser emission power varies with temperature or the like, and it is necessary to control to maintain a constant power under such a condition.

A typical control method is to implement loop control through the input of an output from a controller to control a laser power to maintain a constant level according to an output signal from a front monitor to monitor a laser emission output, which is referred to hereinafter as an APC (Automatic Power Control) circuit, into a laser driver to drive the laser, thereby controlling the laser power to maintain a constant optimal level.

The APC circuit is typically composed of an analog circuit as shown in FIG. 5. The APC circuit 200 includes a laser driver 201 to control a laser diode (LD), a front monitor 202, a gain adjuster 203, a S/H (Sample/Hold) circuit 204, an amplifier 205, an LPF (Low Pass Filter) 206, and a DAC (Digital to Analog Converter) 207.

The APC circuit 200 implements loop control. Specifically, in the APC circuit 200, the gain adjuster 203 adjusts the gain of a monitoring result of the front monitor 202, the S/H circuit 204 holds the signal with the adjusted gain in synchronization with an S/H pulse, and it is controlled such that the signal value is equal to a set value that is input through the DAC 207. The operational amplifier 205 outputs a control value for the laser driver 1 through the LPF 206. The output bandwidth of the LPF 206 is a low time constant in order to prevent overpower upon power ON or due to noise, so that it takes a certain time until a laser output reaches a desired value.

However, it is necessary to reach a desired power instantaneously upon start of recording or the like. The above-described loop control takes too much time and fails to reach a desired power instantaneously.

Further, in a DVD-RAM disk to record data on both of a groove track and a land track, an optimal recording power for recording on a groove track and an optimal recording power for recording on a land track are different. It is therefore necessary to switch a recording power instantaneously at a switching point from a land portion to a groove portion and a switching point from a groove portion to a land portion. However, in the analog loop operation as in FIG. 5, the laser output cannot instantaneously reach a desired value.

To address this problem, there is a technique of setting a laser power using a microprocessor or the like as shown in FIG. 6 rather than using the analog loop operation. An APC circuit 300 of FIG. 6 includes a microprocessor 325 instead of the operational amplifier 205, the LPF 206 and the DAC 207 of FIG. 5. The microprocessor 325 includes a monitoring section 326 to monitor the output of the S/H circuit 204 and a laser power setting section 327 to generate a control value to set a laser power. In the APC circuit 300, the monitoring section 326 such as an A/D converter in the microprocessor 325 monitors a level from the front monitor 202, and the laser power setting section 327 detects a change in the level and makes correction as needed.

The control method using the microprocessor 325 corrects a laser power intermittently. Therefore, a larger monitoring interval causes less accurate power control. On the other hand, a smaller monitoring interval causes an overload on the microprocessor in return for a higher accuracy.

A laser power control method which aims to maintain a stable write quality on an optical disk upon stop and resume of recording during protection against buffer under-run is disclosed in Japanese Unexamined Patent Application Publication No. 2003-99935 (Yamamoto). Yamamoto teaches, for quick restoration of a laser power upon start of recording, a technique of starting a power output with an output value (fixed value) from a microprocessor and then shifting to loop control with a signal from a front monitor after stabilization.

FIG. 7 is a view showing a laser power controller 400 disclosed in Yamamoto. Upon start of recording, an analog SW 428 is at H, so that a given level that is set in a laser power setting section 427 of a microprocessor 425 is supplied to the laser driver 201. An emitted laser power then is output from the front monitor 202, and a recording power is extracted by the gain adjuster 203, the S/H circuit 204, and the LPF 206. A monitoring section 426 of a microprocessor 425 monitors an output of the LPF 206. After it detects that the output level becomes a constant level, the analog SW 428 is set to L so as to shift to the loop operation according to a signal from the front monitor 202. It is thereby possible to shoot the recording power up instantaneously upon start of recording and then maintain stable loop control after that.

The laser power control using the APC circuit taught by Yamamoto is effective for CD-R/RW, DVD-R/RW, or DVD+R/RW disks where recording mark M is recorded on a groove track GT only, and no recording is made on a land track LT where address information (e.g. LPP (Land Pre-Pit) in DVD-R/RW) is stored as shown in FIG. 8. It is thus effective for a case where no abrupt change in recording power occurs during recording.

On the other hand, in a DVD-RAM disk shown in FIG. 9, recording is made on both of a groove track and a land track. In a DVD-RAM, an address signal is recorded as PID (Physical ID) per sector using a method called CAPA (Complimentary Allocated Pit Addressing). A recording area (a land or a groove) between CAPAs is wobbled. It is possible to locate the position of the next CAPA by counting the wobble.

In such a DVD-RAM, an optimal recording power for recording on a groove track and an optimal recording power for recording on a land track are different. It is therefore necessary to switch a recording power instantaneously at a switching point from a land portion to a groove portion and a switching point from a groove portion to a land portion. However, because the loop operation by the LPF 206 with a slow time constant is in progress at those points, it is unable to change a recording power instantaneously. Further, the APC circuit disclosed in Yamamoto requires monitoring by the monitoring section 426 to detect the stabilization of an output of the LPF 206 and switching the control according to the monitoring result, which causes slower processing of the microprocessor.

SUMMARY OF THE INVENTION

According to one aspect of the present invention, there is provided a laser power controller including an output control section to control a laser light output level of an optical head that applies laser light onto a disk to record data to be a prescribed value, a holding section to hold a laser control level preceding a switch timing to switch a laser output level during recording as a previous level, and a control switch section to switch whether to control the laser light output level by the output control section or by the previous level held in the holding section according to the switch timing.

The present invention includes a section to control a laser output level according to a previous level, a section to control the laser output level to be a prescribed value, and a control switch section to switch between these sections. If there is a need to switch a laser output level during recording, the control switch section can switch the section to control the laser output level at a desired timing. The present invention thus provides a laser power controller and a laser power control method capable of switching a laser output level instantaneously when needed, and an optical disk recording apparatus including the laser power controller.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Exemplary embodiments of the present invention are described hereinafter in detail with reference to the drawings. In the following embodiments, the present invention is applied to a laser power controller and an optical disk recording apparatus suitable for a DVD-RAM with land/groove recording format.

First Embodiment

Figure 1:
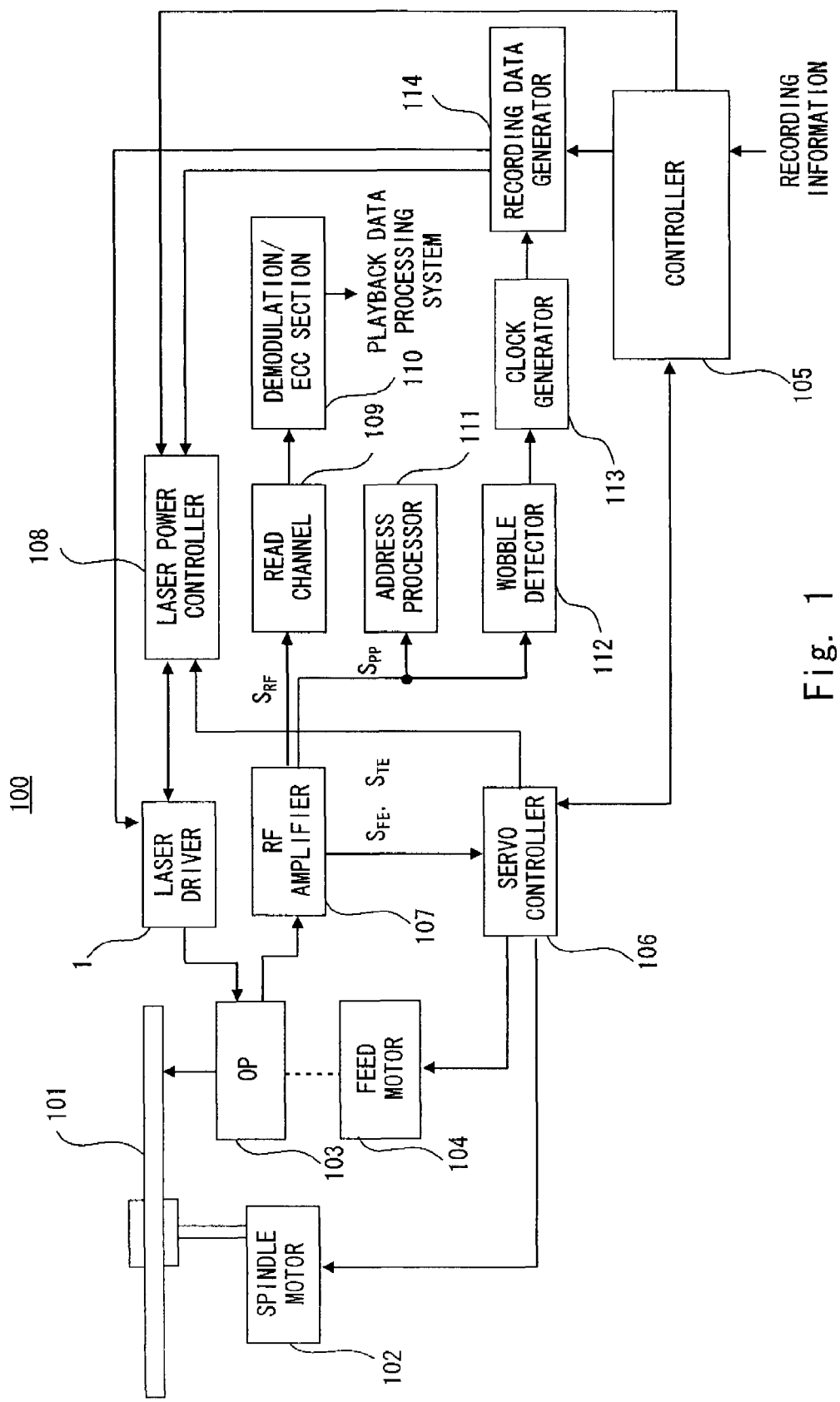
FIG. 1 is a view showing the configuration of an optical disk apparatus according to an embodiment of the present invention.

An overview of an optical disk apparatus is described hereinafter. FIG. 1 is a view showing the configuration of an optical disk apparatus according to an embodiment of the present invention. The optical disk apparatus 100 includes a spindle motor 102 to drive the rotation of an attached optical disk 101, an optical pickup 103 composed of a semiconductor laser (laser diode), an objective lens, a photodetector or the like, a laser driver 1 to drive the laser diode, and a feed motor 104 to move the optical pickup 103 in the radial direction of the optical disk 101. A laser beam emitted from the laser diode of the optical pickup 103 is reflected on a recording surface of the optical disk 101, and the reflected light is detected by the photodetector of the optical pickup 103.

The optical disk apparatus 100 further includes a controller 105 to control the operation of the drive as a whole and a servo controller 106. The servo controller 106 controls the tracking and focus of the optical pickup 103 and also controls the operation of the feed motor 104. The servo controller 106 further controls the rotation of the spindle motor 102.

The optical disk apparatus 100 further includes an RF amplifier 107 to process an output signal of the photodetector in the optical pickup 103 to generate a playback RF signal $S_{RF}$, a focus error signal $S_{FE}$, a tracking error signal $S_{TE}$, and a push-pull signal $S_{PP}$. The focus error signal $S_{FE}$ may be generated by astigmatism, and the tracking error signal $S_{TE}$ may be generated by DPD (Differential Phase Detection) during playback and by push-pull during recording.

The focus error signal $S_{FE}$ and the tracking error signal $S_{TE}$ generated in the RF amplifier 107 are supplied to the servo controller 106. The servo controller 106 uses these error signals to control the tracking or the focus in the optical pickup 103.

The optical disk apparatus 100 further includes a read channel 109 to perform a series of analog signal processing such as binarization slicing of the playback RF signal $S_{RF}$ generated in the RF amplifier 107 and subsequent generation of synchronous data by a signal generator (Phase-Locked Loop), and a demodulation/ECC section 110 to perform processing such as demodulation of the synchronous data generated in the read channel 109 and subsequent error correction. The output data from the demodulation/ECC section 110 is supplied to a playback data processor, which is not shown.

The optical disk apparatus 100 further includes an address processor 111. The address processor 111 transfers address information that is extracted from the playback RF signal $S_{RF}$ by the read channel 109 to the controller 105. The address processor 111 further obtains address information by processing the push-pull signal $S_{PP}$ and transfers the address information obtained from the push-pull signal $S_{PP}$ to the controller 105. The optical disk apparatus 100 further includes a wobble detector 112 to detect a wobble signal from the push-pull signal $S_{PP}$ generated in the RF amplifier 107.

A photodetector constituting the optical pickup 103 may be a 4-division photodetector. In such a case, if detection signals of four photodiodes Da to Dd constituting the photodetector are Sa to Sd, the RF signal $S_{RF}$ is: $S_{RF}$=Sa+Sb+Sc+Sd. The push-pull signal $S_{PP}$ is: $S_{PP}$=(Sa+Sd)−(Sb+Sc).

The wobble detector 112 extracts a wobble signal from the detection signals Sa to Sd and supplies it to a clock generator 113. The clock generator 113 generates a recording clock according to the wobble signal and supplies it to a recording data generator 114. The recording data generator 114 generates recording data according to the recording clock and recording information transmitted through the controller 105 and supplies is to the laser driver 1.

The optical disk apparatus 100 further includes a laser power controller 108 to control the laser output of the laser driver 1. The laser power controller 108 according to this embodiment includes a holding section and a control switch section in addition to an existing loop control section to control an output level of laser light of a laser diode to be a predetermined value. The holding section holds, as a previous level, the laser output level immediately before a laser output level switch timing upon track change of a land track (which is also referred to hereinafter as a land portion) and a groove track (hereinafter as a groove portion). The control switch section switches whether to control the output level of laser light either by the loop control section or by the previous level held in the holding section. The control switch section switches the control of a laser light output level at the timing to switch the laser output level during recording. It is thereby possible to control the laser output level stably by loop control during normal recording and to switch to an optimal laser output instantaneously upon track change between a land track and a groove track.

Figure 2:
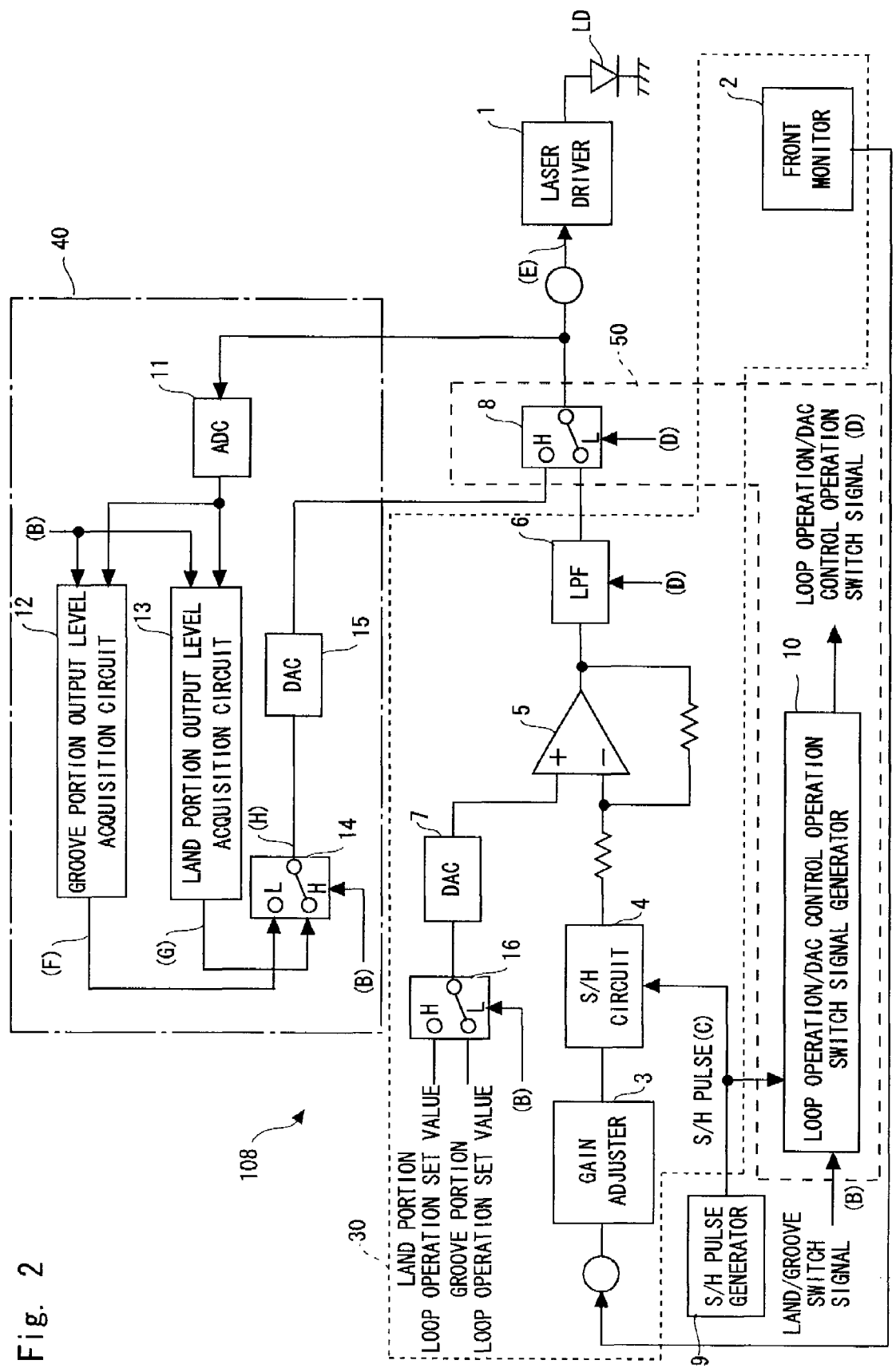
FIG. 2 is a block diagram showing a laser power controller according to a first embodiment of the present invention.

The laser power controller according to the first embodiment of the present invention in an optical disk apparatus having the above-described configuration is described hereinafter. FIG. 2 is a block diagram showing the laser power controller (APC circuit) according to the first embodiment of the present invention. The laser power controller 108 includes a loop control section 30, a DAC control section 40, and an analog SW 8. The loop control section 30 controls a laser output to be a constant value according to an output result of a front monitor 2 to monitor light from a laser diode LD. The DAC control section 40 controls the laser driver 1 according to a previous laser output level. The analog SW 8 switches between control by the loop control section 30 and control by the DAC control section 40 according to a loop operation/DAC control operation switch signal (D). The loop operation/DAC control operation switch signal (D) is generated by a loop operation/DAC control operation switch signal generator 10, which is described later. The loop operation/DAC control operation switch signal generator 10 and the analog SW 8 constitute a control switch section 50.

The loop control section 30 includes a gain adjuster 3, a S/H circuit 4, a selector (digital switch) 16, a DA converter (DAC) 7, an operational amplifier (OPAMP) 5, and an LPF 6.

The gain adjuster 3 adjusts the gain of an output from the front monitor 2. The S/H circuit 4 performs sample and hold in synchronization with a S/H pulse sent from the recording data generator 114 to extract a recording power portion from the gain-adjusted signal. The selector 16 selectively outputs either a land portion loop operation set value (which is referred to hereinafter as a land set value) VL and a groove portion loop operation set value (hereinafter as a groove set value) VG according to a land/groove switch signal (B). The DA converter (DAC) 7 converts an output from the selector 16 into an analog value. The land/groove switch signal (B) is transmitted from the servo controller 106 and it indicates the timing when a recording track changes from a land track to a groove track or from a groove track to a land track. The operational amplifier (OPAMP) 5 receives an output of the DAC 7 at the "+" terminal and an output of the S/H circuit 4 at the "−" terminal. The LPF 6 receives an output of the operational amplifier 5.

The servo controller 106 generates a land/groove switch signal (B) which indicates whether the currently recorded track is a land track or a groove track according to address information. Further, the servo controller 106 includes a S/H pulse generator 9 to generate a S/H pulse (C) for each of a land track and a groove track and supplies it to the S/H circuit 4 and the loop operation/DAC control operation switch signal generator 10.

The land set value VL and the groove set value VG may be values that are selected such that a laser output is an optimum in a land portion and a groove portion, respectively, according to a result of trial writing performed upon start of recording after the optical disk 101 is set. These values may be updated by the controller 105 every time trial writing is performed such as upon setting of an optical disk or the like.

The DAC control section 40 includes an AD converter (ADC) 11, a groove portion output level acquisition circuit 12, a land portion output level acquisition circuit 13, a selector (digital switch) 14, and a DAC 15.

The AD converter (ADC) 11 converts a control value for the laser driver 1 into a digital value. The groove portion output level acquisition circuit 12 and the land portion output level acquisition circuit 13 hold the output of the ADC 11 as a groove portion output level or a land portion output level, respectively, according to the land/groove switch signal (B). The selector 14 selectively outputs either an output (F) of the groove portion output level acquisition circuit 12 or an output (G) of the land portion output level acquisition circuit 13 according to the land/groove switch signal (B). The DAC 15 converts an output of the selector 14 into an analog value.

The control switch section 50 includes the loop operation/DAC control operation switch signal generator 10 and the analog SW 8 as described earlier. The loop operation/DAC control operation switch signal generator 10 generates a loop operation/DAC control operation switch signal (D) according to the land/groove switch signal (B) and the S/H pulse (C). The analog SW 8 switches between control by the loop control section 30 or control by the DAC control section 40 according to the loop operation/DAC control operation switch signal (D).

The overall operation is described hereinafter. An output signal of the front monitor 2 that monitors an emission output of the laser diode LD is input to the gain adjuster 3 where it is adjusted to an optimal level and then input to the S/H circuit 4 where a recording power portion only is sampled to thereby extract a recording power. The output of the S/H circuit 4 is inputted to the "−" input terminal of the operational amplifier 5. To the "+" input terminal of the operational amplifier 5, on the other hand, is inputted to an output of the DAC 7 which is set to a given level so as to output an optimal recording power in each of a land portion and a groove portion.

The output of the operational amplifier 5 is input to the analog LPF 6. The LPF 6 has a relatively low time constant during normal operation in order to prevent overpower upon power ON or due to noise. The loop operation/DAC control operation switch signal (D) is supplied to the analog SW 8 and the LPF 6. While the analog SW 8 selects the DAC control section 40 according to the loop operation/DAC control operation switch signal (D), the time constant of the LPF is set to a high bandwidth in order for early follow-up to a change in signal level from the front monitor 2 upon change in recording power between a land portion and a groove portion. At the timing when the analog SW 8 switches to select the loop control section 30 according to the loop operation/DAC control operation switch signal (D), the time constant of the LPF is set back to a normal low bandwidth.

The output of the analog LPF 6 is input to the laser driver 1 through the analog SW 8. In this manner, the loop control is implemented so as to equalize the output of the DAC 7 and the output of the S/H circuit 4 or the recording power level from the front monitor 2, thereby controlling a laser output power to be an optimal level.

The output of the analog SW 8, which is the input of the laser driver 1, is connected to the ADC 11, so that a control voltage of the laser driver 1 is converted into a digital value and monitored constantly. The output of the ADC 11, which is a control voltage value of the laser driver 1, is held in the groove portion output level acquisition circuit 12 and the land portion output level acquisition circuit 13 as a groove portion output level and a land portion groove portion, respectively.

The outputs of the groove portion output level acquisition circuit 12 and the output of the land portion output level acquisition circuit 13 are input to the DAC 15 through the selector 14 controlled according to the land/groove switch signal (B). The output of the DAC 15 is connected to the laser driver 1 through the analog SW 8.

The laser power controller 108 can thereby select whether to control the laser driver 1 by the output of the LPF 6 for loop control from the front monitor 2 or by the output of the DAC 15 according to the loop operation/DAC control operation switch signal (D). Further, by setting the loop operation/DAC control operation switch signal (D) to an appropriate timing, it is possible to implement stable loop control by the signal from the front monitor 2 during normal time and to perform instantaneous power control from the DAC 15 based on the previous level held in the groove portion output level acquisition circuit 12 and the land portion output level acquisition circuit 13 when a recording power changes upon track change between a land portion and a groove portion.

Figure 3:
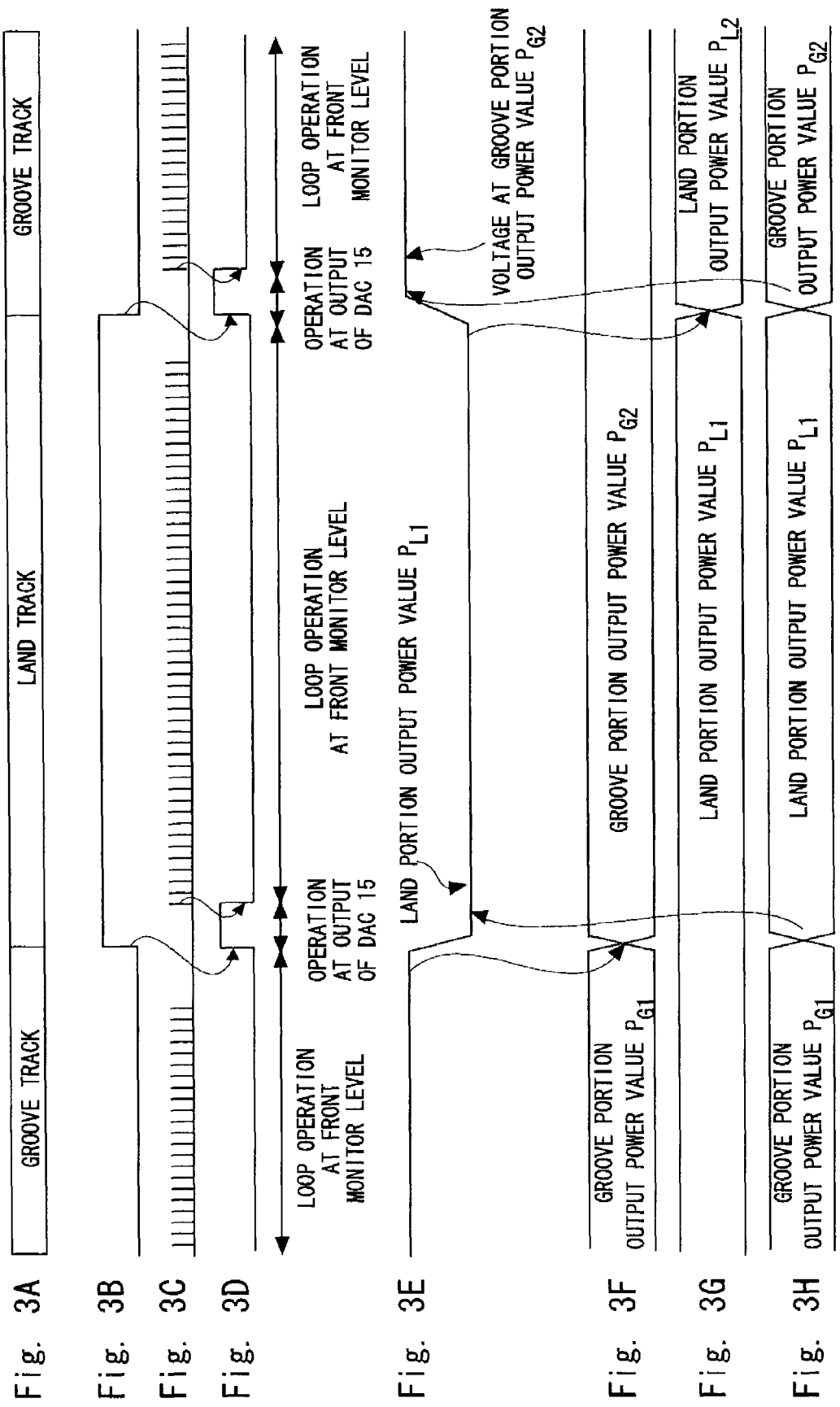
FIGS. 3A-3H are timing charts to describe the operation of the laser power controller according to the first embodiment of the present invention.

The operation according to the present embodiment is described hereinafter in further detail. FIGS. 3A-3H are timing charts showing the operation of the laser power controller 108 according to this embodiment. FIG. 3A indicates a position on a disk: a groove track or a land track. FIG. 3B indicates a land/groove switch signal, which is at Low level on a groove track and at High level on a land track. FIG. 3C indicates a S/H pulse to extract a recording power portion, which is generated in the S/H pulse generator 9.

The land/groove switch signal (B) and the S/H pulse (C) are input to the loop operation/DAC control operation switch signal generator 10 where a loop operation/DAC control operation switch signal (D) is generated. The loop operation/DAC control operation switch signal (D) according to this embodiment turns to High level at the rising edge or falling edge of the land/groove switch signal (B) and turns back to Low level at the S/H pulse (C) which is input after the rising edge or falling edge (change) of the land/groove switch signal (B).

The loop operation/DAC control operation switch signal (D) stays High level for a certain time period from a switching point from a land portion to a groove portion and a switching point from a groove portion to a groove portion. During the High level period, the analog SW 8 selects the output of the DAC 15 as the output (E) to the laser driver 1. During the Low level period, the analog SW 8 selects the output of the LPF 6 so as to implement loop control by the output of the front monitor 2.

The operation to determine a set value of the DAC 15 is described hereinafter. The output of the analog SW 8, which is the input level (E) to the laser driver 1, is converted into a digital value by the ADC 11. The output of the ADC 11 is input to the groove portion output level acquisition circuit 12. The land/groove switch signal (B) is also input to the groove portion output level acquisition circuit 12, and the output of the ADC 11 is latched at the rising edge of the land/groove switch signal (B) or a change point from a groove portion to a land portion. Therefore, the output (F) of the groove portion output level acquisition circuit 12 is the value of the last output power of a groove portion. The output of the ADC 11 is also input to the land portion output level acquisition circuit 13, and the output of the ADC 11 is latched at the falling edge of the land/groove switch signal (B) or a change point from a land portion to a groove portion. Therefore, the output (G) of the land portion output level acquisition circuit 13 is the value of the last output power of a land portion.

The output (F) of the groove portion output level acquisition circuit 12 and the output (G) of the land portion output level acquisition circuit 13 are input to the selector 14. The selector 14 operates according to the land/groove switch signal (B), and selects the output (F) of the groove portion output level acquisition circuit 12 when the land/groove switch signal (B) is Low and selects the output (G) of the land portion output level acquisition circuit 13 when the land/groove switch signal (B) is High.

The output (H) of the selector 14 is input to the DAC 15. Consequently, an output signal of the DAC 15 is the last output power level $P_{G1}$ on the previous groove track when the land/groove switch signal (B) is Low, which is on a groove track, and it is the last output power level $P_{L1}$ on the previous land track when the land/groove switch signal (B) is High, which is on a land track. Further, when the land/groove switch signal (B) becomes Low, the last output power level $P_{G2}$ on the previous groove track is held.

Accordingly, when the loop operation/DAC control operation switch signal (D) is High, which is when the output of the DAC 15 is selected, the output of the analog SW 8 or the input signal (E) to the laser driver 1 is the last output voltage $P_{G1}$ on the previous groove track if on a groove track, and it is the last output voltage $P_{L1}$ on the previous land track if on a land track.

The last output voltage $P_{G1}$, $P_{L1}$, $P_{G2}$ or the like on the previous track which is latched at the timing when the land/groove switch signal (B) switches between High and Low is a voltage that is loop-controlled by the level from the front monitor 2 at that time, which is a control voltage to control a laser recording power to be an optimal value.

Although it is described above that the loop operation/DAC control operation switch signal (D) turns to High level at the rising edge or falling edge of the land/groove switch signal (B) and turns back to Low level at the S/H pulse (C) which is input after the rising edge or falling edge of the land/groove switch signal (B), it is possible to extend for a given time period until the output is stabilized according to a time constant of the LPF 6.

The laser power output according to a fixed value output (a previous laser power output held value) of the DAC 15 is a stable voltage that is loop-controlled by the APC operation on the previous track, and the output voltage to the S/H circuit 4 from the front monitor 2 is substantially equivalent to the loop-controlled stable voltage. Because the time constant of the LPF 6 is normally set to a high value in order to prevent overpower upon power ON or due to noise as described earlier, the output of the LPF 6 changes very slowly. Accordingly, if the operation is switched from a fixed value control by the DAC to the analog APC operation control before the output of the LPF 6 is stabilized, the laser power changes. Therefore, if the time constant of the LPF 6 is high, it is possible to extend the High period of the loop operation/DAC control operation switch signal (D) to perform control by an initial value, which is the DAC control operation, until the output of the LPF 6 is stabilized.

Further, if the time constant of the LPF 6 is reduced during output of the previous laser power output held value so that the output of the LPF 6 is substantially equivalent to the stable loop-controlled voltage on the previous track, the laser power fluctuation upon switching from a fixed value control to the analog APC operation is substantially eliminated. It is thereby possible to set the DAC control operation period to be variable according to the time constant of the LPF 6. In either case, the control by the loop control section 30 and the control by the DAC control section 40 may be switched automatically by the loop operation/DAC control operation switch signal (D).

The first embodiment is described with reference to the case where a track change occurs during recording operation and control is made to allow a laser power to reach an optimal value instantaneously. Because a laser power changes due to the temperature change of a laser diode LD or the like during the recording operation, it is preferred to control a laser power using the previous laser power output held value, which is the previous laser power output value. On the other hand, when the previous laser power held value is not available such as upon start of recording on a new disk or after a long-time interval of recording when the temperature of a LD changes significantly from that of the previous recording, a laser power output may be controlled using a pre-measured initial value rather than using the previous laser power held value. Therefore, the groove portion output level acquisition circuit 12 and the land portion output level acquisition circuit 13 may have, in addition to the previous laser power output held value, an initial value which can be output in those cases to perform the DAC control with the initial value when a LD is not used for a certain period of time such as upon start of recording. The initial value may be an optimal laser power value which is obtained by trial writing, in which case the initial value can be set by the controller 105 to the groove portion output level acquisition circuit 12 and the land portion output level acquisition circuit 13.

According to this embodiment, the output of the DAC 15 is used as a control voltage of the laser driver LD for a certain time period from a switching point from a land track to a groove track and a switching point from a groove track to a groove track. During the other period, the loop operation with a level from the front monitor 2 that monitors a laser power is performed.

Specifically, the operation is automatically switched according to the loop operation/DAC control operation switch signal (D) so as to control the laser driver 1 with the previous laser power output held value for a certain time period from the switching between a land track and a groove track and to perform the loop control with a front monitor level during the other period. It is thereby possible to instantaneously respond to a change in recording power from a land track to a groove track or from a groove track to a land track while maintaining a stable recording power with the loop operation by the front monitor 2 during normal recording operation. Further, the output of the DAC 15 can be a substantially optimal recording power because it is a control voltage of the laser driver on the previous track.

Further, by holding the last output level of a land track and a groove track as a previous laser power output held value and controlling to set the held level to be a laser power output value on the next track, a control voltage to the laser driver using the previous laser power output held value can be a voltage which produces an optimal recording power. Further, there is no need to perform monitoring or control by a microprocessor to implement such control, thus imposing no burden on the microprocessor.

Second Embodiment

Figure 4:
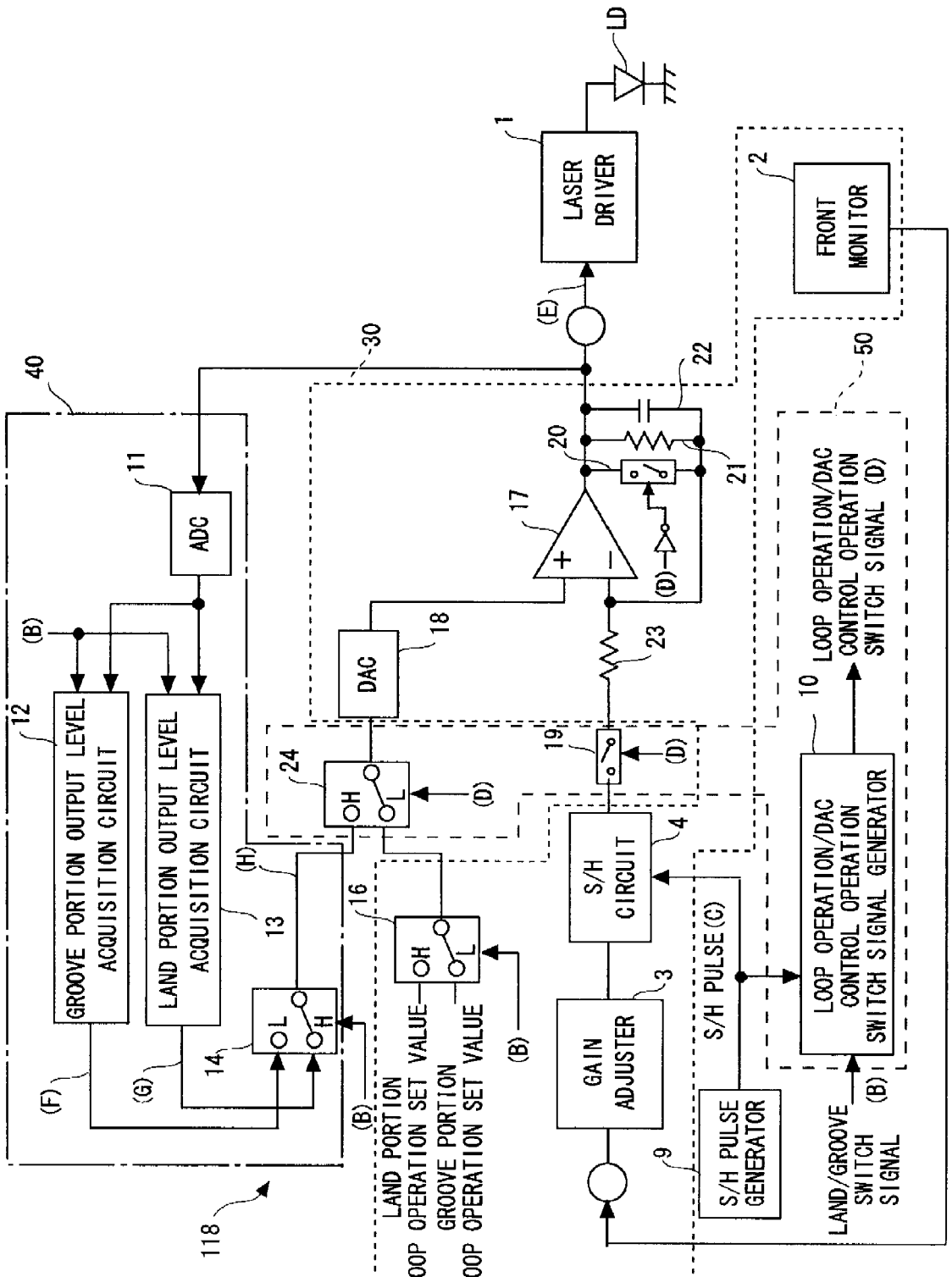
FIG. 4 is a block diagram showing a laser power controller according to a second embodiment of the present invention.
Figure 5:
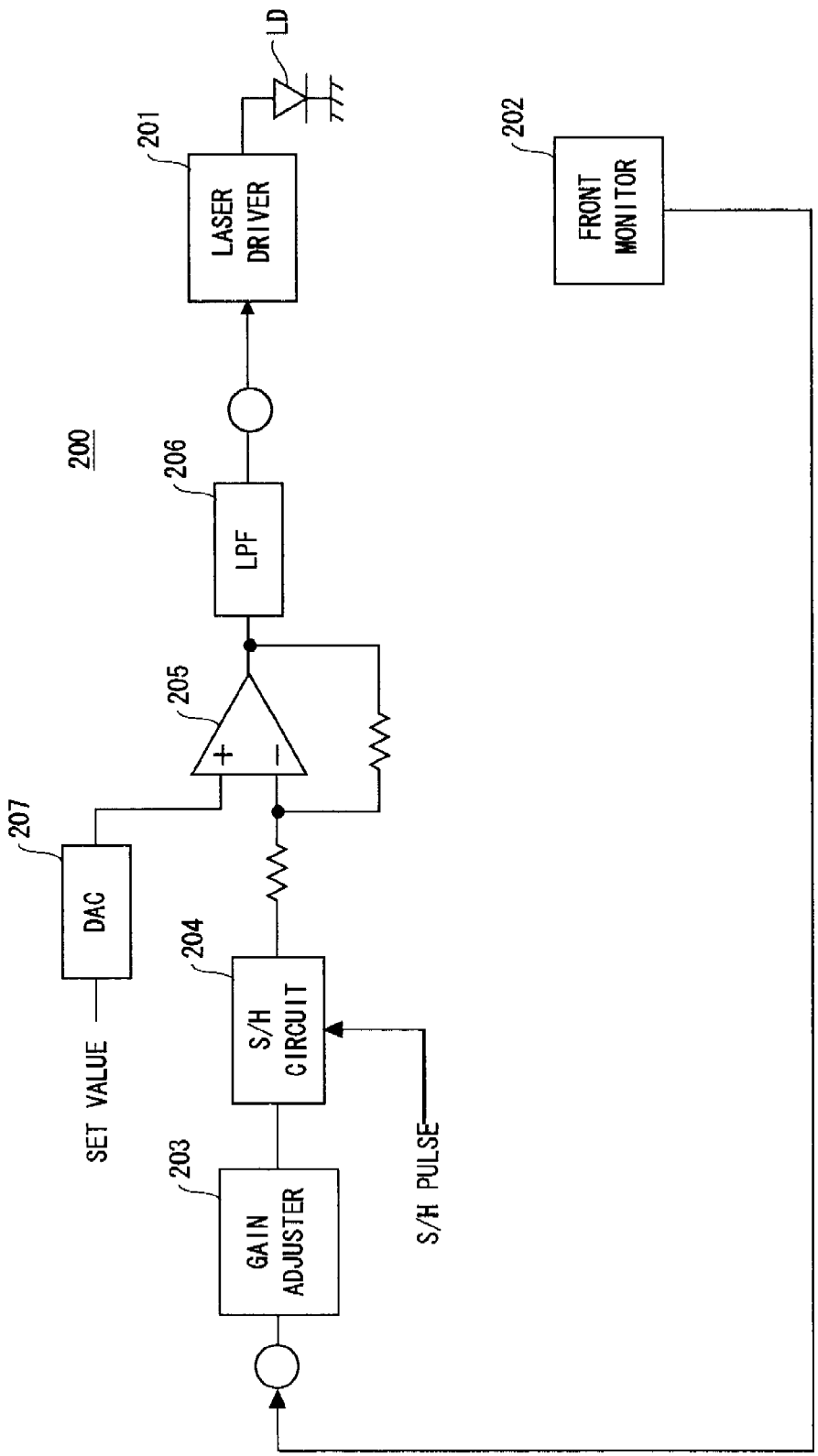
FIG. 5 is a block diagram showing an analog circuit as a typical laser power controller.
Figure 6:
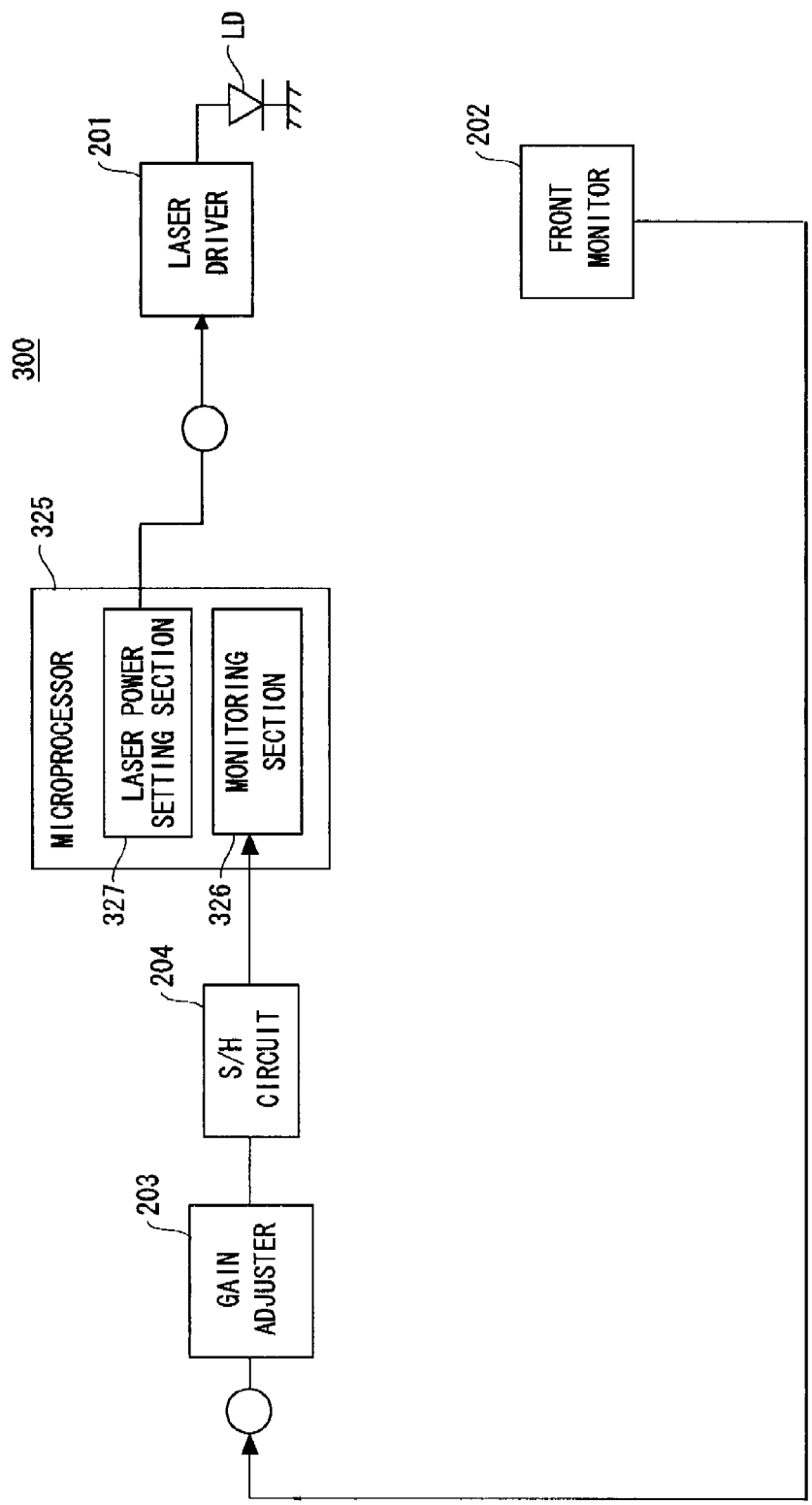
FIG. 6 is a block diagram showing a laser power controller using a microprocessor according to a related art.
Figure 7:
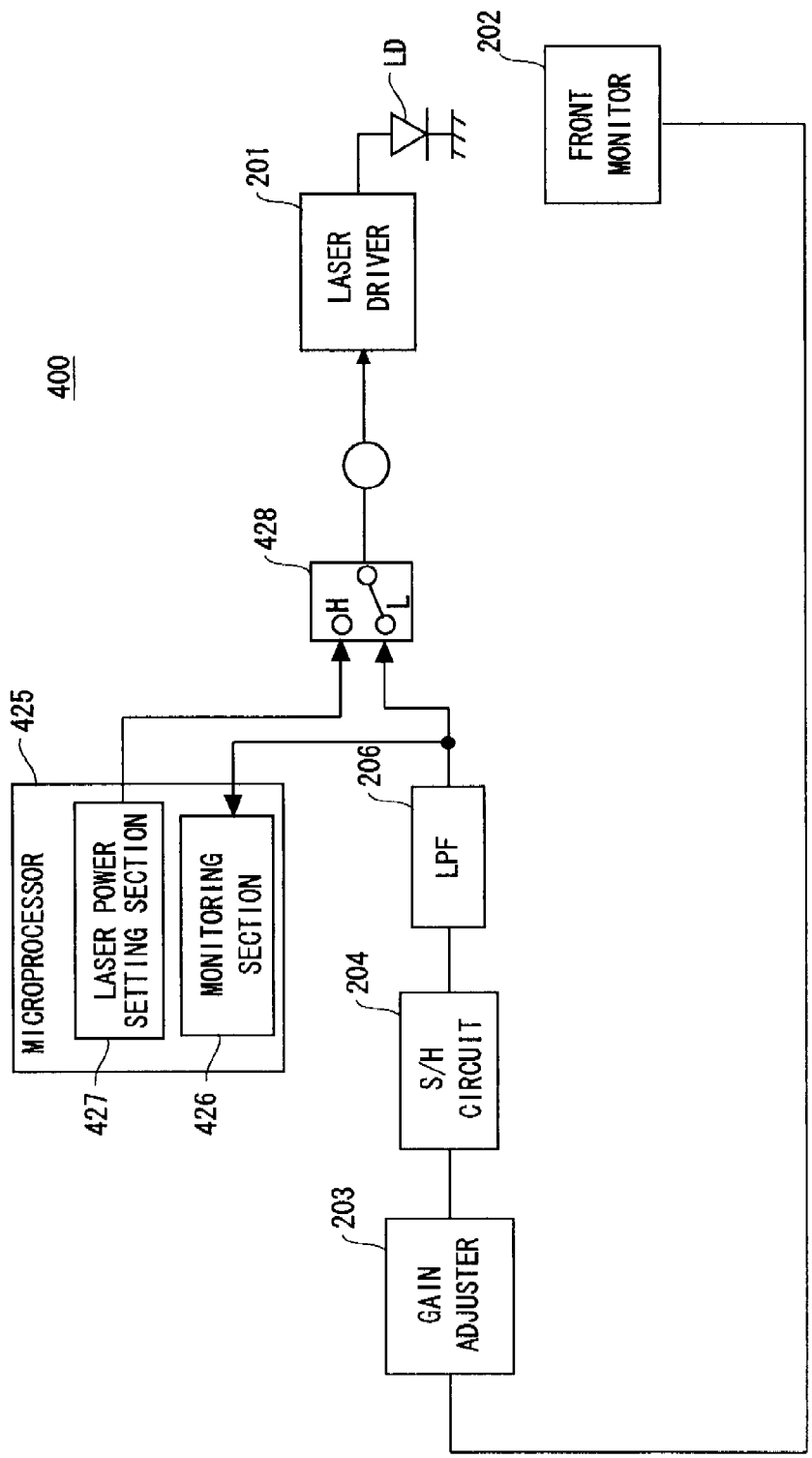
FIG. 7 is a view showing a laser power controller disclosed in Yamamoto.
Figure 8:
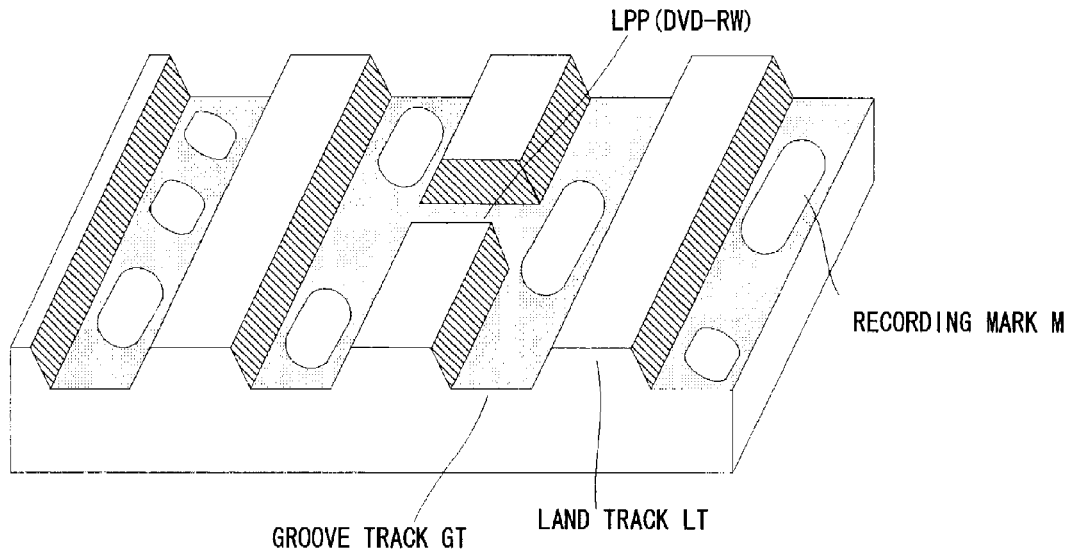
FIG. 8 is a schematic view showing the structure of an optical disk with groove track recording.
Figure 9:
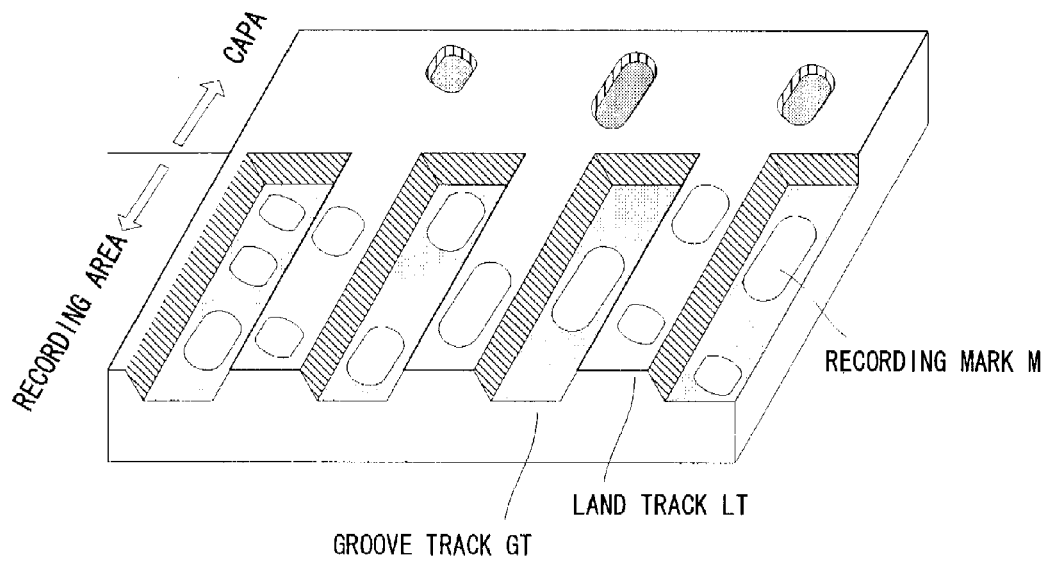
FIG. 9 is a schematic view showing the structure of an optical disk (DVD-RAM) with land/groove track recording.

A second embodiment of the present invention is described hereinafter. The configuration of this embodiment is basically the same as, but simplified from, that of the first embodiment. FIG. 4 is a block diagram showing a laser power controller 118 according to this embodiment. In this embodiment, the operational amplifier 5 and the LPF 6, and the DACs 7 and 15 of the first embodiment shown in FIG. 2 are respectively integrated together. In the second embodiment shown in FIG. 4, the same elements as in the first embodiment shown in FIG. 2 are denoted by the same reference symbols and not described in detail herein.

As shown in FIG. 4, an analog SW 19 that turns ON and OFF according to the loop operation/DAC control operation switch signal (D) is placed in the subsequent stage of the S/H circuit 4 and it is connected to the "−" terminal of an operational amplifier 17 through a resistor 23. The output of the selector 14 that switches between the output of the groove portion output level acquisition circuit 12 and the output of the land portion output level acquisition circuit 13 is connected to one input of a selector (digital switch) 24. The output of the selector 16 that selectively outputs either one of a land set value VL and a groove set value VG according to the land/groove switch signal (B) is connected to the other input of the selector 24. The selector 24 supplies either one of these outputs to the DAC 18 according to the land/groove switch signal (B). The DAC 18 thus serves both as the DAC 7 and the DAC 15.

The output of the DAC 18 is input to the "+" terminal of the operational amplifier 17. An analog SW 20, a resistor 21, and a capacitor 22 are connected in parallel between the output and the "−" terminal of the operational amplifier 17. The analog SW 20 turns ON and OFF according to the loop operation/DAC control operation switch signal (D). The circuit composed of the operational amplifier 17, the analog SW 20, the resistor 21 and the capacitor 22 functions as a LPF or a full feedback buffer according to ON and OFF of the analog SW 20.

The operation of the laser power controller 118 according to the second embodiment is described hereinafter. When the loop operation/DAC control operation switch signal (D) is at Low level, which is during the loop control operation, the analog SW 19 is ON, so that an output signal of the S/H circuit 4 is input to the "−" terminal of the operational amplifier 17. The analog SW 20 is OFF, and thereby the operational amplifier 17 serves as an LPF having frequency characteristics determined by the resistor 21 and the capacitor 22. In such a case, the selector 24 selects a land set value VL or a groove set value VG, and an analog value of the selected value is output from the operational amplifier 17. The laser driver 1 is loop-controlled to have the output value.

On the other hand, the output of the DAC 18 is connected to the "+" terminal of the operational amplifier 17. Because the loop operation/DAC control operation switch signal (D) is at Low level, an optimal recording power set value of a land portion or a groove portion which is selected according to the land/groove switch signal (B) is input to the DAC 18. Thus, the loop control operation with a front monitor level is performed in this case.

When the loop operation/DAC control operation switch signal (D) is at High level, the analog SW 19 is OFF, and the analog SW 20 is ON. The operational amplifier 17 thus functions as a full feedback buffer to output a voltage of the DAC 18 which is input to its "+" terminal and therefore the output voltage changes instantaneously. Specifically, the previous laser power output held value is selected by the selector 24, and an analog value of the selected value is output from the DAC 18. The analog SW 19 is OFF and the loop control is not performed, and the laser driver 1 is controlled by the output value of the DAC 18.

The input to the DAC 18 is the previous laser power output value, which is the output (F) of the groove portion output level acquisition circuit 12 or the output (G) of the land portion output level acquisition circuit 13. This value is the last output value of a previous land track or groove track as described in the first embodiment, which produces a substantially optimal recording power.

This embodiment has the equal effects as the first embodiment. Specifically, in the laser power control for recording onto a disk with land/groove recording such as DVD-RAM, an output power of a groove portion and a land portion are monitored and stored. Then, when there is a track change from a groove portion to a land portion or a track change from a land portion to a groove portion, a fixed value is output at the stored previous control voltage of a land portion or groove portion, and then the loop control by a signal from the front monitor is performed. This enables quick response to a change in laser power output and control of a laser power output at an optimal level. Further, this embodiment enables reduction of a circuit size by integrating the DACs 7 and 15 into the DAC 18.

It is apparent that the present invention is not limited to the above embodiment that may be modified and changed without departing from the scope and spirit of the invention.

What is claimed is:

1. A laser power controller comprising:
an output control section to control a laser light output level of an optical head that applies laser light onto a disk to record data to be a prescribed value;
a holding section to hold a laser control level preceding a switch timing to switch a laser output level during recording as a previous level; and
a control switch section to switch the laser light output level to the prescribed value from the output control section or the previous level held in the holding section according to the switch timing
wherein the control switch section comprises:
a selector to switch between control of the laser light output level according to the previous level held in the holding section and control of the laser light output level by the output control section; and
a switch signal generator to generate a switch signal to control switching of the selector, the switch signal generator generating the switch signal based on a detection signal to detect a track change between a land track and a groove track, and a sample/hold pulse.

2. The laser power controller according to claim 1, wherein the switch timing is a track switch timing between a land track and a groove track.

3. The laser power controller according to claim 2, wherein the holding section comprises:
a land output level holding section to hold a last laser control level on a land track at a track switch timing from a land track to a groove track as a previous land level; and
a groove output level holding section to hold a last laser control level on a groove track at a track switch timing from a groove track to a land track as a previous groove level.

4. The laser power controller according to claim 3, wherein the control switch section controls the laser light output level by the previous level held in the holding section for a certain time period from the switch timing.

5. The laser power controller according to claim 3, wherein the output control section is a loop control section to control the laser light output level to be the prescribed value based on a monitoring result of the laser light.

6. The laser power controller according to claim 2, wherein the control switch section controls the laser light output level by the previous level held in the holding section for a certain time period from the switch timing.

7. The laser power controller according to claim 2, wherein the output control section is a loop control section to control the laser light output level to be the prescribed value based on a monitoring result of the laser light.

8. The laser power controller according to claim 1, wherein the control switch section controls the laser light output level by the previous level held in the holding section for a certain time period from the switch timing.

9. The laser power controller according to claim 1, wherein the output control section is a loop control section to control the laser light output level to be the prescribed value based on a monitoring result of the laser light.

10. The laser power controller according to claim 9, wherein
the control switch section controls the laser light output level according to the previous level held in the holding section for a certain time period from the switch timing to stabilization of an output of the loop control section.

11. A recording apparatus comprising:
an optical head to apply laser light onto a disk to record data;
a laser driver to drive the optical head; and
a control section to control the laser driver, the control section including:
an output control section to control a laser light output level to be a prescribed value;
a holding section to hold a laser control level preceding a switch timing to switch a laser output level during recording as a previous level; and
a control switch section to switch the laser light output level to the prescribed value from the output control section or the previous level held in the holding section according to the switch timing
wherein the control switch section comprises:
a selector to switch between control of the laser light output level according to the previous level held in the holding section and control of the laser light output level by the output control section; and
a switch signal generator to generate a switch signal to control switching of the selector, the switch signal generator generating the switch signal based on a detection signal to detect a track change between a land track and a groove track and, a sample/hold pulse.

12. A laser power controller comprising:
an output control section configured to control a laser light output level of an optical head that emits laser light onto a land track and a groove track of a disk such that the laser output level becomes a prescribed value;
a holding section including a land output level holding section and a groove output level holding section,
wherein the land output level holding section is configured to hold a first control level to control the output level of the laser light when the emitted laser light moves from the land track to the groove track at a first switch time
wherein the groove output level holding section is configured to hold a second control level to control the output level of the laser light when the emitted laser light moves from the groove track to the land track at a second switch time,
wherein values of the first control level and the second control level change at the first and second switch timings during recording data; and
a control switch section coupled to the output control section and the holding section to switch a control of the laser light output level by the first control level or the second control level to a control of the laser light output level by the output control section after a predetermined period passes from the first switch timing or the second switch timing.

13. The laser power controller according to claim 12, wherein the control switch section comprises:
a selector to switch between control of the laser light output level by the first control level or the second control level and control of the laser light output level by the output control section, and
a switch signal generator to generate a switch signal to control switching of the selector,
the switch signal generator generating the switch signal based on a detection signal to detect a track change between the land track and the groove track, and a sample/hold pulse.

* * * * *